United States Patent
Galligan et al.

(10) Patent No.: US 7,872,643 B2
(45) Date of Patent: Jan. 18, 2011

(54) SYSTEM AND METHOD FOR A DIGITAL PROJECTION ADVERTISING DISPLAY

(75) Inventors: Jude P. Galligan, Houston, TX (US); Matthew J. Wood, New York, NY (US)

(73) Assignee: Wallspace Media, LLC, Houston, TX (US)

(*) Notice: Subject to any disclaimer, the term of this patent is extended or adjusted under 35 U.S.C. 154(b) by 1256 days.

(21) Appl. No.: 11/417,569

(22) Filed: May 3, 2006

(65) Prior Publication Data
US 2007/0258016 A1 Nov. 8, 2007

(51) Int. Cl.
*G06F 3/038* (2006.01)
(52) U.S. Cl. .............................. 345/204; 345/7; 348/744
(58) Field of Classification Search ................. 345/7–9, 345/158, 204; 348/744
See application file for complete search history.

(56) References Cited

U.S. PATENT DOCUMENTS

| | | | | |
|---|---|---|---|---|
| 7,576,727 | B2* | 8/2009 | Bell | 345/158 |
| 7,583,258 | B2* | 9/2009 | Kong | 345/204 |
| 2005/0141997 | A1* | 6/2005 | Rast | 416/229 R |
| 2005/0219473 | A1* | 10/2005 | Moriyama et al. | 353/79 |
| 2006/0047967 | A1* | 3/2006 | Akhan et al. | 713/176 |
| 2007/0075917 | A1* | 4/2007 | Nishi | 345/8 |

* cited by examiner

*Primary Examiner*—Kimnhung Nguyen
(74) *Attorney, Agent, or Firm*—Vista IP Law Group LLP

(57) ABSTRACT

A projection advertising display system which can withstand the environmental conditions of the projection site, allows for remote operation and monitoring and provides for long-term, legitimate projected advertising in or on third-party structures. The digital projection advertising display system comprises a projection surface, such as the exterior side or interior wall of a building, which is covered by a long-term agreement allowing the projection of advertising images on said projection surface, and a projection unit comprising a projector, an environmental control system, a monitoring camera, and a computer. Each of the components of the projection unit is operatively coupled to a computer which controls and monitors the function of each of the components. The computer is networked to a central computer remote from said projection unit and can remotely control and monitor the functions of the projection unit. A plurality of projection units may be networked to the central computer to allow central control and monitoring of each of the projection advertising displays. The method provides for obtaining long-term agreements for the use of the projection surfaces and the sites for mounting the projection units.

13 Claims, 5 Drawing Sheets

SYSTEM AND METHOD FOR A DIGITAL PROJECTION ADVERTISING DISPLAY

FIELD OF THE INVENTION

The field of the invention generally relates to advertising displays, and more particularly to a system and method for a digital projection advertising display.

BACKGROUND OF THE INVENTION

Several systems for projecting advertising images onto a display surface, including for outdoor advertising such as billboards, have been previously described. For example, U.S. Pat. No. 5,570,138, describes a projected advertising system having a retractable projection screen which is implemented onto a standard fixed billboard. The fixed billboard image is displayed during the daytime. During the nighttime, the projection screen is automatically unrolled in front of the fixed billboard image and a projector placed in front of the screen is used to project advertising images onto the screen. The system can be controlled by photoelectric light sensors or remotely controlled via radio wave signals. Similar systems utilizing display screens and projectors are described in U.S. Pat. Nos. 3,198,066; 3,020,798; and 2,491,184.

There are many advantages of a projection advertising display over a fixed image advertising display. For one, the image can be more easily changed by simply changing the projected image rather than having to physically replace the conventional static advertisement adhered to the advertising surface (such as a billboard, poster, painting, etc.). In addition, moving video images can be displayed, whereas a fixed image display can at best display one of several images (for example by rotating panels, or reeling a screen).

Video advertising has been implemented on video displays such as LED screens, LCD screens and plasma TV screens, but such screen technology is very expensive and the screen sizes are generally limited to being much smaller than typical outdoor billboards.

A digital projection advertising image has several advantages over the aforementioned systems. The image from a relatively small projector can be made very large with the use of lenses; moreover, a large image can be projected at a fraction of the cost of a comparably-sized LED or LCD display. In addition, it is possible to project the image directly onto the exterior surface of an existing building such that there is very little physical infrastructure cost as with building a billboard or mounting a screen. Thus, the real estate is not physically affected as with other types of video or static billboard advertising.

Indeed, a limited amount of projected video advertising has been previously done by projecting the advertising image onto an exterior surface of a building using a projector placed on or in an adjacent building. The image is projected directly onto the building wall without the use of a screen. However, all such projected video advertising has been done either illegitimately without permission of the property owners or more rarely, as temporary event advertisements. Because such advertisements are being placed illegally, the projector requires local control of their operation with at least one person remaining on-site to monitor and protect the projector,. This also requires that the projector be easily moved in the event of detection by unreceptive property owners. Because of the impermanence of such advertisements, the projectors have not been designed to withstand prolonged exposure to outdoor environmental conditions and the projection display cannot be offered to an advertiser on a long-term or even permanent basis.

Accordingly, there is need for a digital projection advertising display system and method which overcomes the shortcomings and disadvantages of previous systems and methods.

SUMMARY OF THE INVENTION

The present invention provides a system and method for providing a digital projection advertising display and display network which can withstand outdoor environmental conditions, allows for remote operation and monitoring, and provides for long-term, legitimate projected advertising onto third-party structures such as an external or indoor wall surface. The projection system of the present invention comprises a projection unit having a weatherproof housing which encloses a projector and a microcomputer, such as a laptop computer. The projection unit may be a video projection unit capable of projecting moving images and/or static images or it may be only capable of projecting static images. The projection unit may also include an environmental control system for controlling the environmental conditions of the interior of the housing, such as the temperature and the humidity.

The projector is operatively coupled to the microcomputer such that the microcomputer can control the operation of the projector. The microcomputer can control all or most of the projector functions, such as turning the projector on/off, delivering the advertising content to be projected to the projector and moving and resizing the projected image. The environmental control system may comprise an independent controller, but it is preferably also operatively coupled to the microcomputer.

The video projection unit may also include a monitoring camera which is aimed at the image being projected by the system. The monitoring camera is used to check the integrity of the image on the projection surface, such as a wall of an adjacent building, to monitor for irregularities in the advertising image, such as obstructions in the projected light, or changes in the projection surface (such as graffiti). The monitoring camera is operatively coupled to the microcomputer.

The microcomputer is networked to a remote computer or server. The remote computer can be used to remotely monitor the function and condition of the projection system, such as the environmental conditions and the advertising being projected. The remote computer can also be used to remotely control the functions of the projection system, to transfer advertising content to the microcomputer of the projection system and to check the images acquired by the monitoring camera. The projection system may also include a traffic monitoring device which is operatively connected to the microcomputer to monitor car or foot traffic, or other advertising metering characteristics.

In a further innovative aspect of the present invention, legal agreements are obtained for the long-term, legitimate use of the projection surface and the site for mounting the projection system. Leases or other similar agreements are obtained from third-party property owners for the use of the projection surface and the location for mounting the projection systems. In this way, the projection system may be mounted permanently or semi-permanently to the location. Then, agreements with advertisers are obtained for the display of projected advertising over a set period of time.

DETAILED DESCRIPTION OF THE INVENTION

Figure 1:
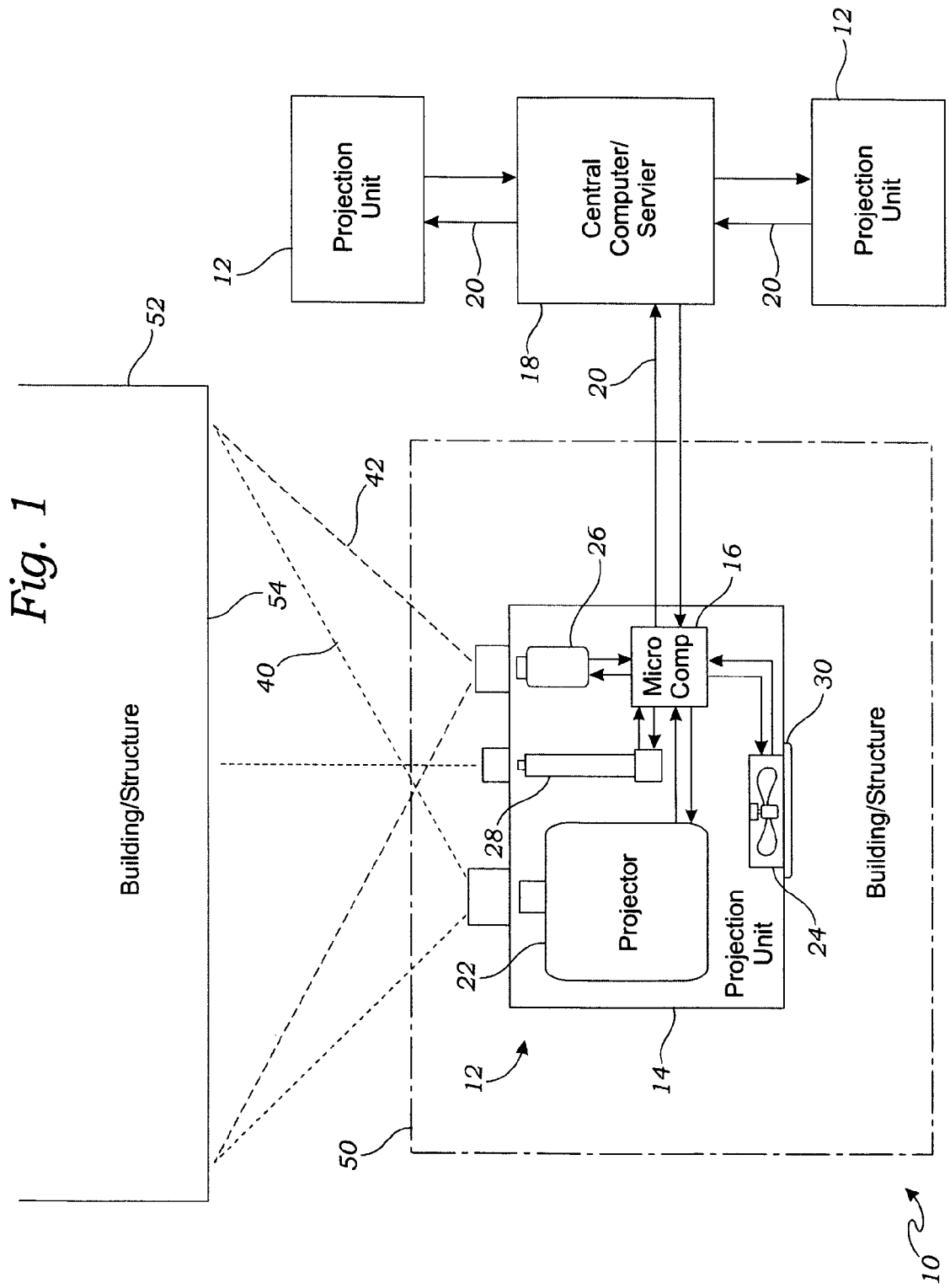
FIG. 1 is schematic representation of a digital projection advertising display system according to the present invention.

Turning to FIG. 1, a digital projection advertising display system 10 according to the present invention is depicted in a block diagram representation. The video projection system 10 comprises a plurality of video projection units 12, each having a microcomputer 16 which is connected to a central computer or server 18 over a computer network 20. The computer network 20 may be a dedicated wide area network, local area network, wireless network, a TCP/IP network or virtual private network operating over the internet, or other suitable network for the computers to communicate with each other.

The video projection unit 12 comprises a housing 14 which encloses a video projector 22, an environmental control system 24, a monitoring camera 26, a traffic monitoring device 28, and the microcomputer 16. The video projector 22 may be any suitable video projector for projecting still or video images, but it is preferably a high-power video projector capable of projecting high resolution images having a resolution of at least 1024×768 pixels, and still more preferably capable of projecting images of reasonable viewing brightness and clarity at the size of a typical billboard, for example, 14 by 48 feet (60 sheet), 12 by 24 feet (30-sheet) or 5 by 11 feet (8-sheet). However, for indoor uses as contemplated by the present invention, a video projector having less power may effectively be utilized and there may not be a need for an environmental control system 24.

The projection unit 12 is mounted at a location on or in a building 50, such as the building rooftop or on the indoor wall of a building. The projection unit 12 is bolted or otherwise securely affixed to the structure of the building 50, such that it is secured from theft. The projector 22 projects a video image 40 onto a projection surface 54 of an adjacent building 52. For an indoor application of the system 10, the projection surface 54 may be an indoor wall, ceiling, floor, window, projection screen, or other suitable display surface.

The environmental control system 24 comprises environmental condition sensors (not shown) and a temperature and humidity control (not shown). The sensors include temperature sensors which measure the temperature of the inside of the housing 14 and the ambient temperature surrounding the projection unit 12. Humidity sensors may also be utilized to measure the humidity inside and outside the housing 14. The temperature control may simply comprise a fan and a vent 30 (see FIG. 4) in the housing 14. The vent 30 may have motorized shutters 31 which can open to allow air to pass through the vent 30 or close to seal the vent 30. An electric heater is also provided to heat the air within the projection unit 12 when subjected to cold ambient conditions. The operation of the fan, shutters and heater may be controlled by the environmental control system 24 or by the microcomputer 16. The environmental control system 24 is operatively connected to the microcomputer 16. Alternatively, the temperature control system can comprise a refrigeration and/or heater unit which can cool or heat the air within the projection unit 12. The environmental control system also includes a dehumidifier for controlling the humidity of the air within the projection unit 12. An exemplary temperature control scheme is shown in FIG. 5. This control scheme will control the humidity and temperature within the projection unit 12 to acceptable operating conditions for the components within the projection unit 12, especially the projector 22, the monitoring camera 26 and the microcomputer 16.

The microcomputer 16 is a typical computer such as a laptop computer having input/output connections operatively connected to the projector 22, the environmental control system 24, the monitoring camera 26, and the traffic monitoring device 28. The microcomputer 16 controls the function of each of these devices and also receives images and data from these devices and transmits them over the computer network 20 to the central computer 18. The microcomputer may also perform diagnostic checks on each of these devices.

The microcomputer 16 also receives instructions and advertising images from the central computer 18. With respect to the projector 22, the microcomputer 16 controls all or most of the projector functions, including turning the projector on/off, delivering the advertising content in the form of image data to the projector, and moving and sizing the projected image. As for the environmental control system 24, the microcomputer 16 controls the function of each of the components of the environmental control system 24 according to the specified control scheme, such as the scheme shown in FIG. 5.

The microcomputer 16 also receives the images 42 acquired by the monitoring camera 26. The microcomputer 16 may include monitoring software which can determine if there is a problem with the image 42 received by the monitoring camera 26, such as an obstruction. If there is a problem with the image 42, the microcomputer 16 may adjust the projector 22 or send a warning signal to the central computer 18. Also, the microcomputer 16 can send the image received from the monitoring camera 26 to the central computer 18 where it can be checked automatically using the computer or it can be viewed by an operator who can check the integrity of the image. If a problem is detected at the central computer 18, instructions can be sent by the computer or the operator to the microcomputer 16 or to a service technician who can then perform adjustments, corrections or repairs on-site at the projection unit 12.

The microcomputer 16 also receives data signals from the traffic monitoring device 28. The traffic monitoring device 28 may be any suitable device for detecting, tracking or otherwise monitoring potential and/or actual viewing of the projected image. Such devices may include infra-red sensors which can detect car or human movements, sound detectors which can detect traffic noise or the like. The microcomputer 16 receives the data, analyzes the data, and sends the raw data and results of the analyzed data to the central computer 18. The data may then be further analyzed and used for commercial purposes, such as marketing, price setting, and reporting.

Figure 2:
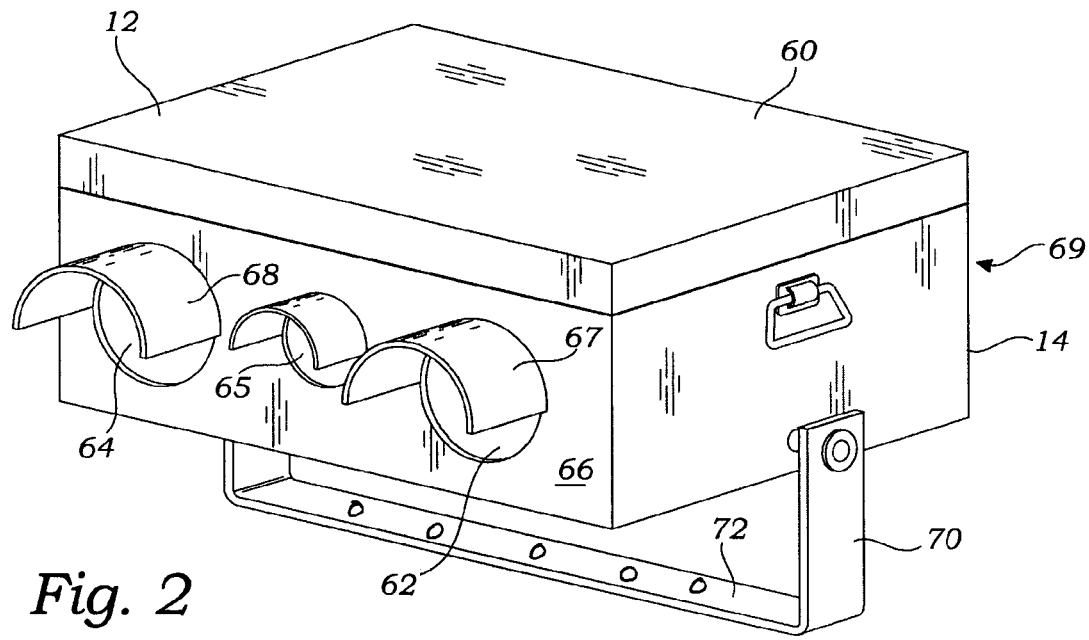
FIG. 2 is a side perspective view of a video projection unit according to the present invention.
Figure 3:
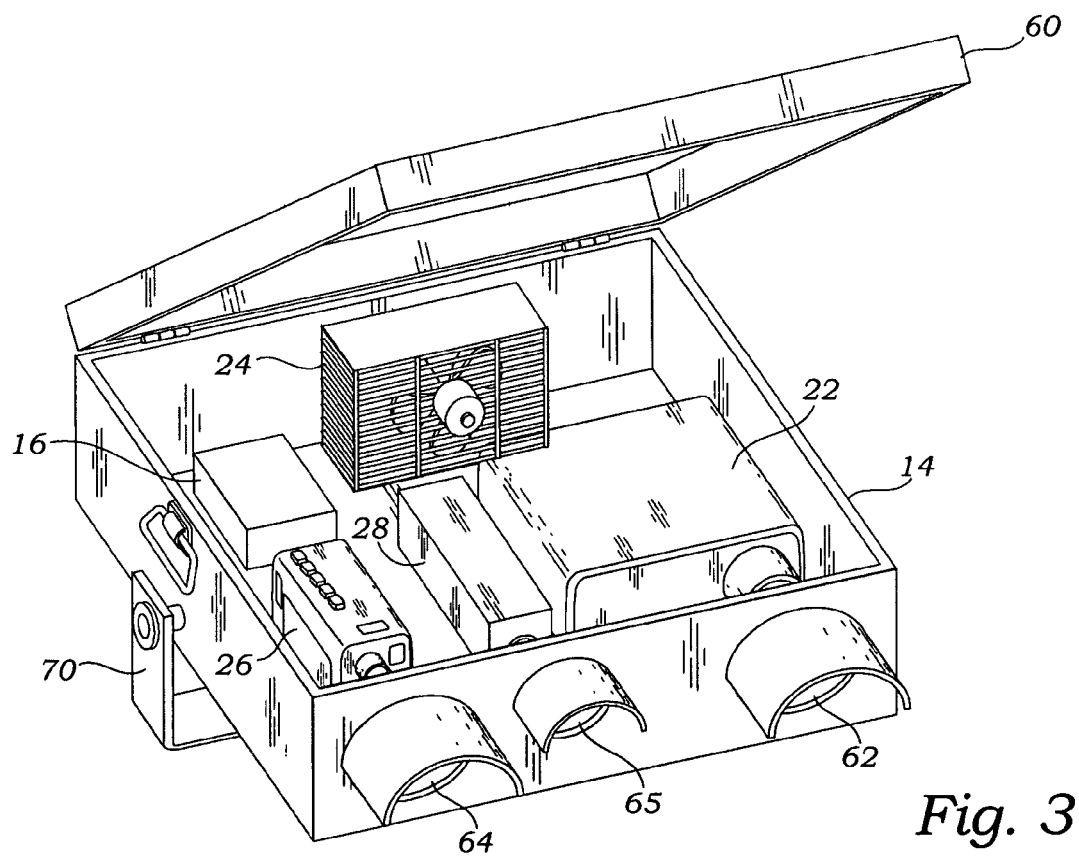
FIG. 3 is a top view of the projection unit of FIG. 2 with the top open.
Figure 4:
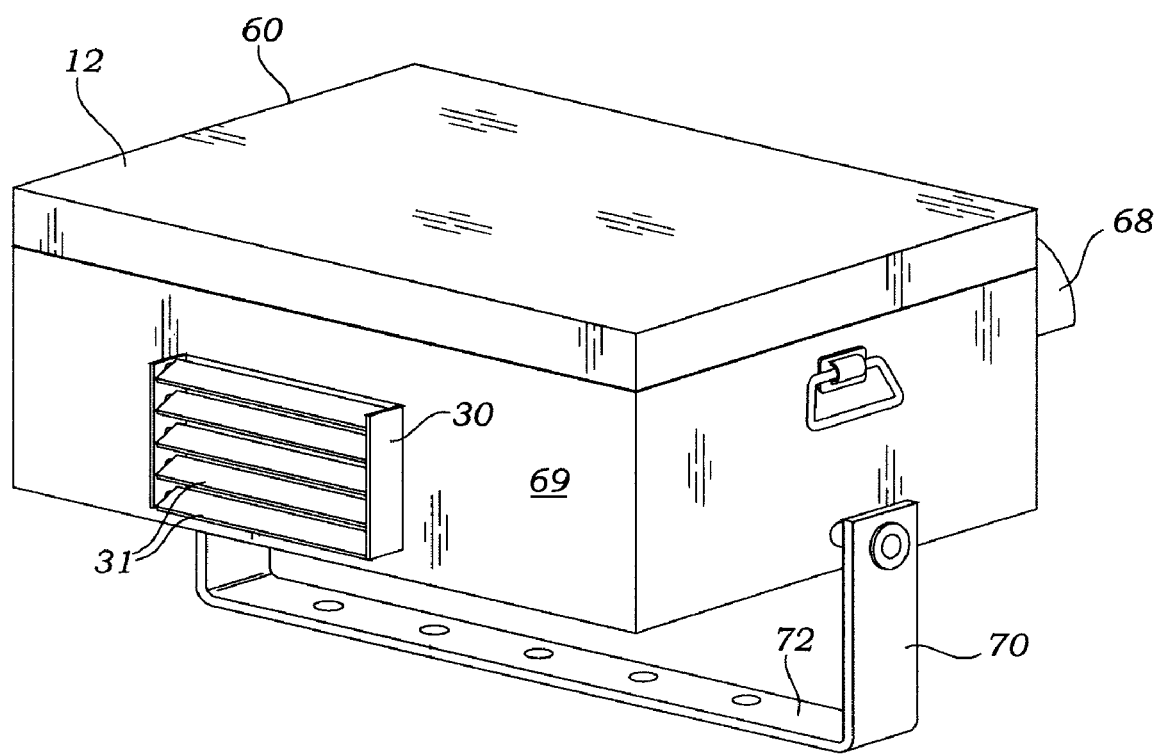
FIG. 4 is a rear perspective view of the projection unit of FIG. 2.
Figure 5:
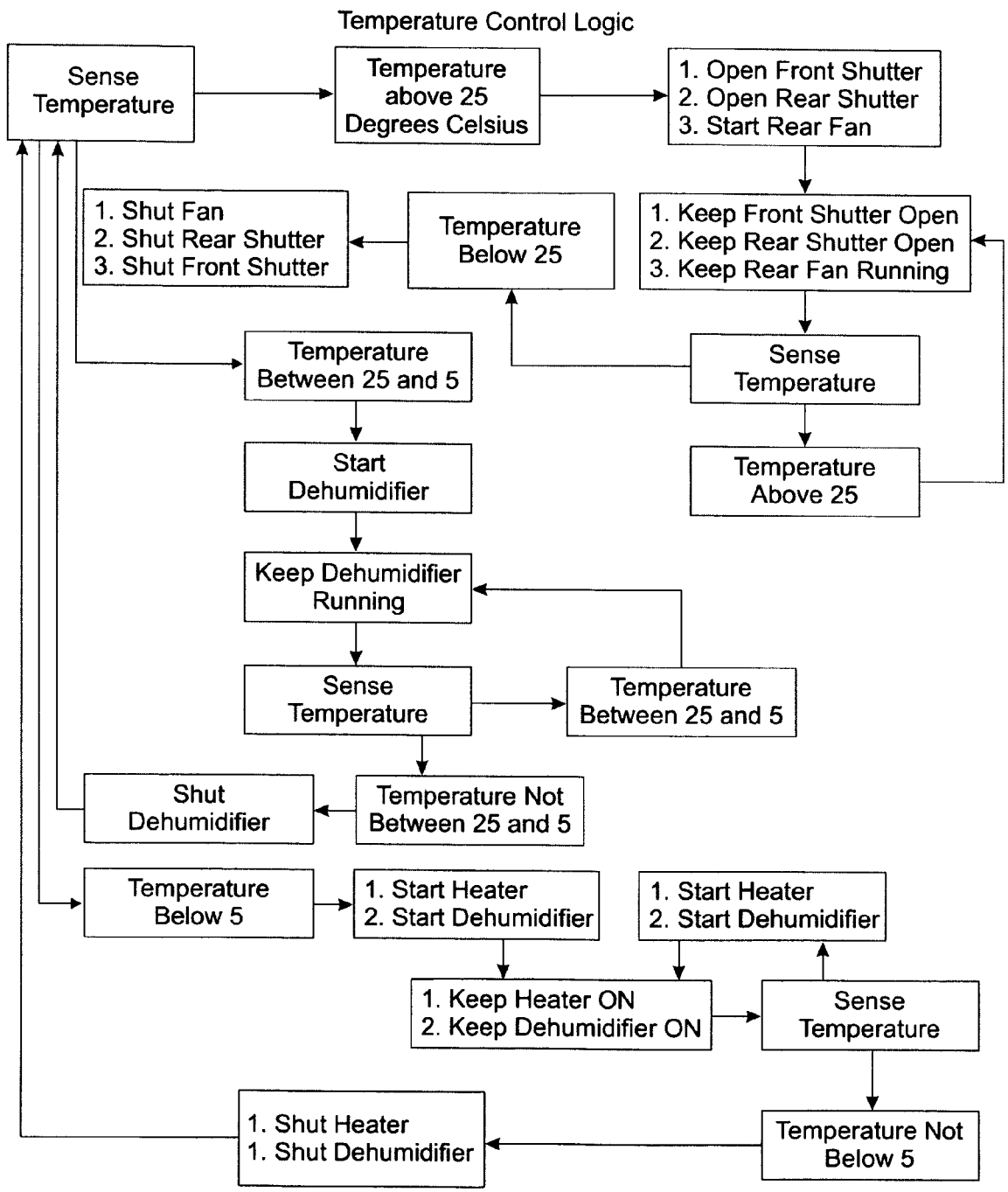
FIG. 5 is a flow chart of a temperature control scheme for a digital projection advertising display system according to the present invention.

Referring now to FIGS. 2-4, the details of the projection unit 12 will now be described. The housing 14 comprises a weatherproof, box-like structure which is made of metal, such as steel or aluminum, plastic or other suitable material. The housing 14 has a cover 60 which is mounted on hinges so that it can be tilted to an open position as shown in FIG. 3. The housing 14 also has a latch which can be locked with a lock to prevent access to the inside of the housing 14. This protects the interior components of the projection unit 12 from theft or vandalism. The housing 14 has seals, such as resilient gaskets or trim, along the seams and openings to seal the interior of the housing 14 from the outside weather conditions. An indoor projection unit 12 may not have all of these features because it is not exposed to outdoor weather conditions. For example, seals and an environmental control system 24 may not be required.

At the front 66 of the housing 14 are two openings 62 and 64 for the projector 22 and the monitoring camera 28, respectively. The openings have shades 67 and 68, respectively, to prevent glare from distorting the images. The openings 62 and 64 are preferably covered by a transparent material such as glass or Plexiglas.

Within the housing 14, the projector 22 is located adjacent the opening 62, the monitoring camera is adjacent the opening 64 and the environmental control system is adjacent the vent 30. The traffic monitoring camera 28 is located near the front 66 of the housing 14 adjacent a third opening 65 in the front 66 of the housing 14. Alternatively, the traffic monitoring camera 28 may be disposed somewhere remote from the projection unit 12 where the camera 28 can more easily detect the traffic of interest. The monitoring camera 28 is then operatively connected to the microcomputer 16 or the central computer by methods known by those of ordinary skill in the art (e.g. wireless RF or IR communication).

The microcomputer 16 may be located anywhere within the housing 14 such that it can be operatively connected to each of the other components within the housing 14. It is also desirable to place the microcomputer where it can be fairly easily accessed when the cover 60 to the housing 14 is open.

At the rear 69 of the housing 14, as shown in FIG. 4, the vent 30 and shutters 31 are provided. A swiveling mounting bracket 70 is rotatably attached to each side of the housing 14. The mounting bracket 70, has a mounting plate 72 which may be bolted or otherwise securely affixed to a structure. The rotatable attachment of the bracket 70 to the housing 14 allows the projection unit 12 to be swiveled in a vertical plane to aim the projection unit 12 in the desired direction and also allows the bracket to be attached to any of a horizontal surface, a vertical surface or an angled surface.

Figure 6:
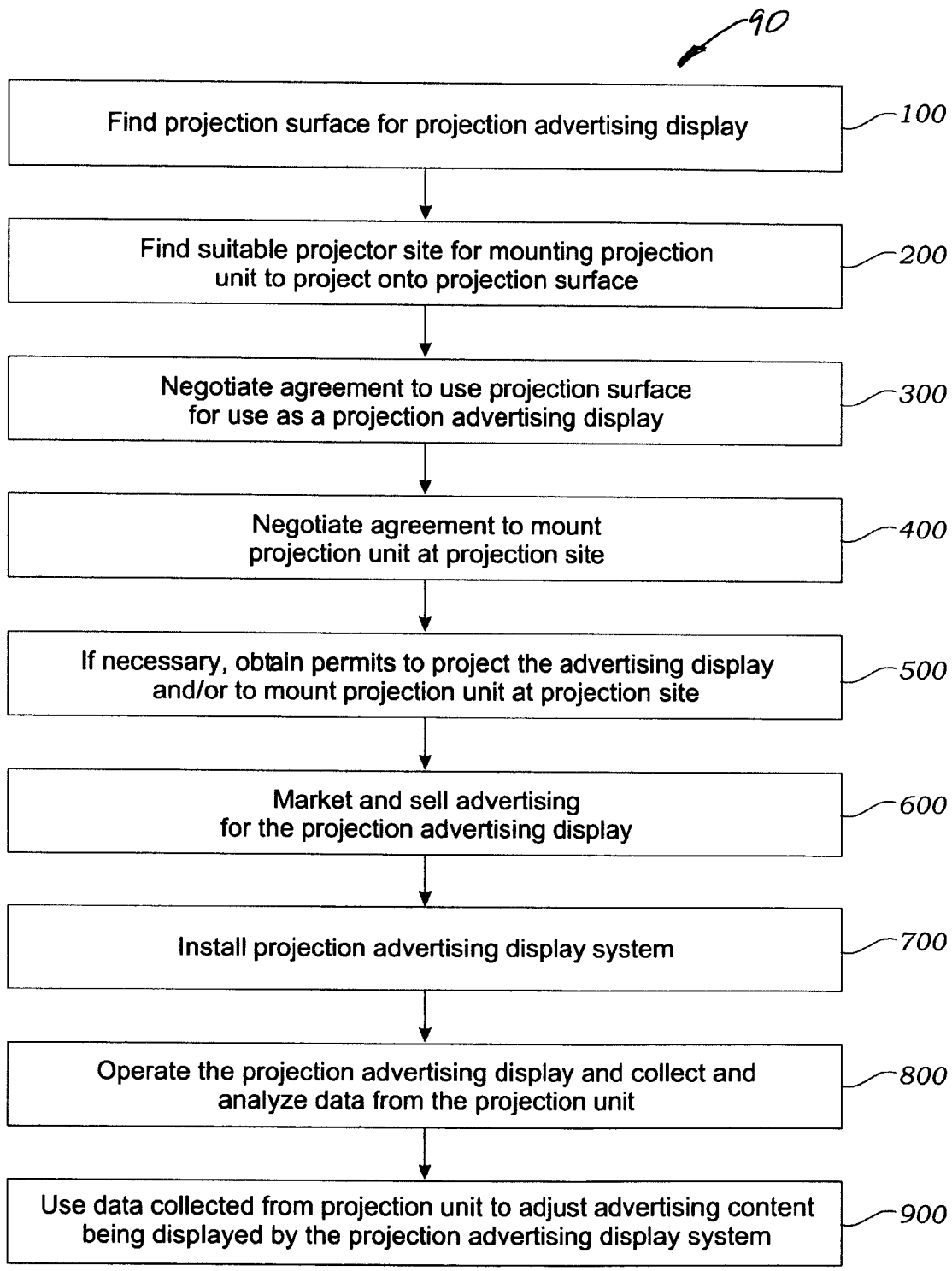
FIG. 6 is a flow chart of an exemplary method of providing advertising via a digital projection advertising display according to the present invention.

Turning now to FIG. 6, the method 90 of providing advertising via a projection advertising display system 10 begins with step 100, finding a desirable projection surface 54 for the video projection display. The projection surface 54 may be the exterior wall of a building, or the interior or exterior wall of event venues (like stadiums and arenas), subway systems, airports, shopping malls or other structure having a large surface upon which an image may be projected. Finding a suitable projection site at step 200 may be performed before, after or simultaneously with step 100, as both steps 100 and 200 are both required in order to accomplish the method 90.

Once a projection surface 54 and projection site have been identified, agreements must be negotiated to utilize the real estate at steps 300 and 400. It is desirable to obtain long-term leases for use of the projection surface and the projection site so that the advertising space can be sold for specified periods, such as 6 months or 12 months or 1 year or longer. Compensation for the use of the projection advertising display site can be structured as a flat fee, a periodic payment, or based upon the compensation received from the sale of advertising on the particular display or network of displays. As discussed above, when the projection surface is not being used as the "display screen," the surface is entirely unaffected by the video projection display system.

Such long-term agreements for the space and the advertising provide many advantages. For example, the display of advertising over a period of time allows the ability to estimate impressions and effectiveness of the advertising over a period of time rather than the short viewing periods afforded by illegitimate or special event projected advertisements. It also facilitates marketing of the advertising space because a particular location which has certain geographic qualities may make the projection advertising display site more or less attractive to certain advertisers. In other words, the projection advertising display site can be targeted to certain advertisers because the site has been locked up with long-term agreements. The projection advertising display system can also be installed securely and permanently or semi-permanently. In this way, the projection system can be left unattended and can be controlled remotely.

At step 500, in jurisdictions where necessary, permits are obtained for projecting the projection display system onto the projection surface and/or for mounting the projection system. At step 600, advertising to be displayed by the projection system is marketed and sold to advertisers, such as advertising agencies or directly to entities desiring to advertise their businesses. Step 600 may be performed at any step within the method 10. For example, step 600 could be performed first (i.e. prior to step 100), and the advertiser may specify a desired geographic area or even a particular building or projection surface. In this fashion, the sale of the advertising may be contingent on the ability to perform steps 100-500. In another example, step 600 could be performed after step 200, such that the advertising deal is contingent upon performing steps 300-500. Or step 600 could precede step 700, such that a projection system is not installed until the advertising is sold. This avoids the capital expense of installing the system if advertising cannot be sold for some reason.

Once agreements for use of the projection surface and projection site are obtained, and permits if necessary, then the projection advertising display system is installed at step 700. Now, the system is operated to project the projection advertising image from the projection site onto the projection surface at step 800. Also, data from the projection advertising display is collected and analyzed, including the data from the traffic monitoring device 28. Then, at step 900, the data can be used for various purposes, including adjusting the advertising content, evaluating the impressions and effectiveness of the advertising over a period of time, and also for marketing and pricing of the advertising space.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A projection advertising display system comprising:
    a projection unit comprising a housing, and a projector, computer and monitoring camera enclosed within said housing, said projector and monitoring camera operatively coupled to said computer;
    said projector configured to project a projected advertising image onto a projection surface;
    said monitoring camera configured to acquire an advertising image that is the reflection of the projected advertising image reflected off the projection surface;
    said computer configured to control the function of said projector and to receive image data from said monitoring camera; and
    an environmental control system configured to control the environmental conditions within said housing, said environmental conditions include the air temperature and humidity and said environmental control system is operatively coupled to said computer.

2. The projection advertising display system of claim 1 wherein said computer is configured to deliver digital image content to said projector.

3. The projection advertising display system of claim 2 wherein said computer is configured to receive scheduled content from remote computer.

4. The projection advertising display system of claim 3 wherein said projection surface is an untreated wall surface or building exterior.

5. The projection advertising display system of claim 1 wherein said housing is weatherproof.

6. The projection advertising display system of claim 1 said projection surface requires no improvements to the underlying real estate.

7. The projection advertising display system of claim 1 wherein said projected advertising image can be easily resized and repositioned by the display system while maintaining a minimum resolution of 760 by 1080 pixels.

8. The projection advertising display system of claim 1 wherein said projector is configured to project an image having a resolution of at least 760 by 1080 pixels.

9. The projection advertising display system of claim 1 wherein said projection unit is configured to project at least one of a moving video image, a static image or both moving video images and static images.

10. The projection advertising display system of claim 1 wherein said housing is weatherproof and configured to be securely fastened to a projection site.

11. The projection advertising display system of claim 1 wherein said computer is networked to a central computer via at least one of a wireless network, a wide area network, a local area network or a TCP/IP network, said central computer located remote from said computer, said central computer configured to serve advertising content to said computer and to monitor and control the function and condition of said projection unit.

12. The projection advertising display system of claim 11 further comprising a plurality of said projection units, wherein each projection unit is networked to said central computer.

13. The projection advertising display system of claim 1 wherein said computer is further configured to check the integrity of the advertising image that is the reflection of the projected image reflected off the projection surface.

* * * * *